(12) United States Patent
Lin

(10) Patent No.: US 9,027,969 B2
(45) Date of Patent: May 12, 2015

(54) PIPE QUICK RELEASE STRUCTURE

(71) Applicant: Xiamen Runner Industrial Corporation, Xiamen (CN)

(72) Inventor: Feng Lin, Xiamen (CN)

(73) Assignee: Xiamen Runner Industrial Corporation, Xiamen (CN)

( * ) Notice: Subject to any disclaimer, the term of this patent is extended or adjusted under 35 U.S.C. 154(b) by 69 days.

(21) Appl. No.: 13/845,516

(22) Filed: Mar. 18, 2013

(65) Prior Publication Data

US 2013/0285367 A1  Oct. 31, 2013

(30) Foreign Application Priority Data

Apr. 25, 2012  (CN) .......................... 2012 2 0179383

(51) Int. Cl.
| | | |
|---|---|---|
| *F16L 21/00* | (2006.01) | |
| *F16L 37/24* | (2006.01) | |
| *F16L 37/084* | (2006.01) | |

(52) U.S. Cl.
CPC ............... *F16L 37/24* (2013.01); *F16L 37/084* (2013.01)

(58) Field of Classification Search
USPC ......... 285/401, 402, 394, 396, 360, 361, 362, 285/314
See application file for complete search history.

(56) References Cited

U.S. PATENT DOCUMENTS

| | | | | |
|---|---|---|---|---|
| 2,076,918 | A * | 4/1937 | Robison | 285/82 |
| 3,100,655 | A * | 8/1963 | Work | 285/33 |
| 3,470,524 | A * | 9/1969 | Culver | 439/317 |
| 3,858,910 | A * | 1/1975 | Oetiker | 285/84 |
| 4,313,626 | A * | 2/1982 | Duncan | 285/86 |
| 4,566,723 | A * | 1/1986 | Schulze et al. | 285/86 |
| 5,087,086 | A * | 2/1992 | Snedeker | 285/361 |
| 7,731,243 | B2 * | 6/2010 | Tiberghien et al. | 285/316 |

* cited by examiner

*Primary Examiner* — Aaron Dunwoody
(74) *Attorney, Agent, or Firm* — Chun-Ming Shih

(57) ABSTRACT

A pipe quick release structure includes a first pipe having at least one guiding element formed on an outer periphery of the first pipe, a second pipe having at least one axial trough defined to correspond to and movably and selectively receive therein the at least one guiding element of the first pipe and a joint securely received in the second pipe and having at least one axial ledge formed on an outer periphery thereof to be movably received in the at least one axial trough of the second pipe, at least one second axial trough defined to receive therein the at least one guiding element of the first pipe and at least one recess defined to communicate with the at least one second axial trough to selectively position the at least one guiding element of the first pipe so as to selectively secure connection of the first pipe to the second pipe.

16 Claims, 9 Drawing Sheets

PIPE QUICK RELEASE STRUCTURE

BACKGROUND OF THE INVENTION

1. Field of the Invention

This invention is related to a pipe quick release structure, and more particular, to a quick release structure enabling two pipes to quickly connect/disconnect to one another.

2. Description of Related Art

In conventional bathroom industry or industrial areas, piping is a system of pipes used to convey fluids (liquids and gases) from one location to another. The engineering discipline of piping design studies the efficient transport of fluid.

Industrial process piping (and accompanying in-line components) can be manufactured from wood, fiberglass, glass, steel, aluminum, plastic, copper, and concrete. The in-line components, known as fittings, valves, and other devices, typically sense and control the pressure, flow rate and temperature of the transmitted fluid, and usually are included in the field of piping design.

Normally, two pipes are connected together via threading. Even though threading connection enables workers to quickly connect two pipes, disconnection of the two pipes is still a time consuming work. Although numerous designs are developed in the market to enable workers to quickly connect two pipes, most of the connecting structures can only help the workers to either quickly connect two pipes or quickly disconnect the connected pipes. None of which has the characteristic to enable the workers to both quickly connect/disconnect pipes. Even so, the bulky and complex structure of the available release structure is still difficult to handle.

SUMMARY OF THE INVENTION

The primary objective of the present invention is to provide a pipe quick release structure to allow quick connection as well as disconnection of the pipes while being used.

In order to accomplish the aforementioned objective, the pipe quick release structure constructed in accordance with the present invention includes a first pipe, a second pipe movably receiving therein a part of the first pipe and a joint securely connected to a part of the first pipe and movably received in the second pipe such that the first pipe is able to connect to the second pipe.

Still another objective of the preferred embodiment of the present invention is that the first pipe of the pipe quick release structure further includes at least one boss firmly formed on an outer periphery of the first pipe, the second pipe has at least one axial trough defined in an inner periphery thereof to correspond to and guide the at least one boss of the first pipe, at least one inclined track defined in the inner periphery thereof to communicate with the at least one axial trough so that after the at least one boss of the first pipe is guided in the at least one axial trough, the at least one boss is able to extend into the inclined track.

A further objective of the preferred embodiment of the present invention is that the joint has at least one axial trough defined in an inner periphery thereof, an inclined hole in communication with the at least one axial trough and a recess defined in a bottom face defining the inclined hole to position the at least one boss of the first pipe after the at least one boss extends into the at least one track of the second pipe to allow the joint to spring back so that the connection between the first pipe and the second pipe is secured.

Still another objective of the present invention is that because of the recovery force provided by a spring sandwiched between second pipe and the joint, the inclined hole is selectively misaligned with the inclined track to position the at least one boss.

BRIEF DESCRIPTION OF THE DRAWINGS

The preferred embodiment(s) of the invention, as well as its many advantages, may be further understood by the following detailed description and accompanying drawings.

DETAILED DESCRIPTION OF THE INVENTION

Figure 1:
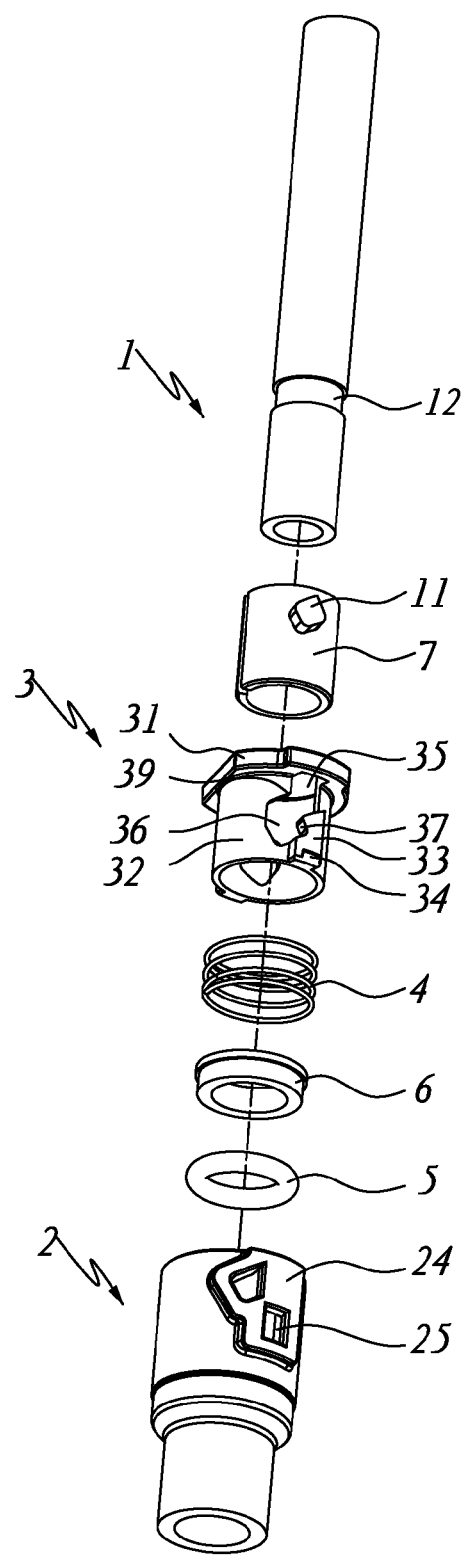
FIG. 1 is an exploded perspective view showing elements of the preferred embodiment of the present invention.
Figure 2:
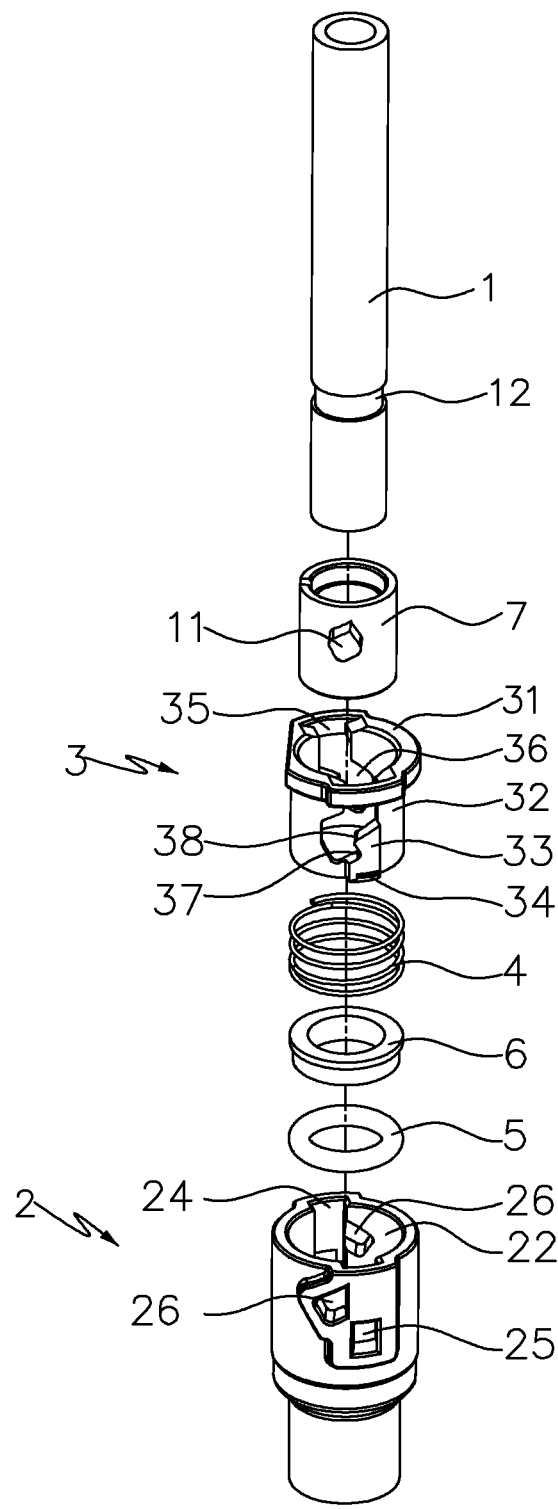
FIG. 2 is still an exploded perspective view showing elements of the preferred embodiment of the present invention from an angle different from that of FIG. 1.
Figure 3:
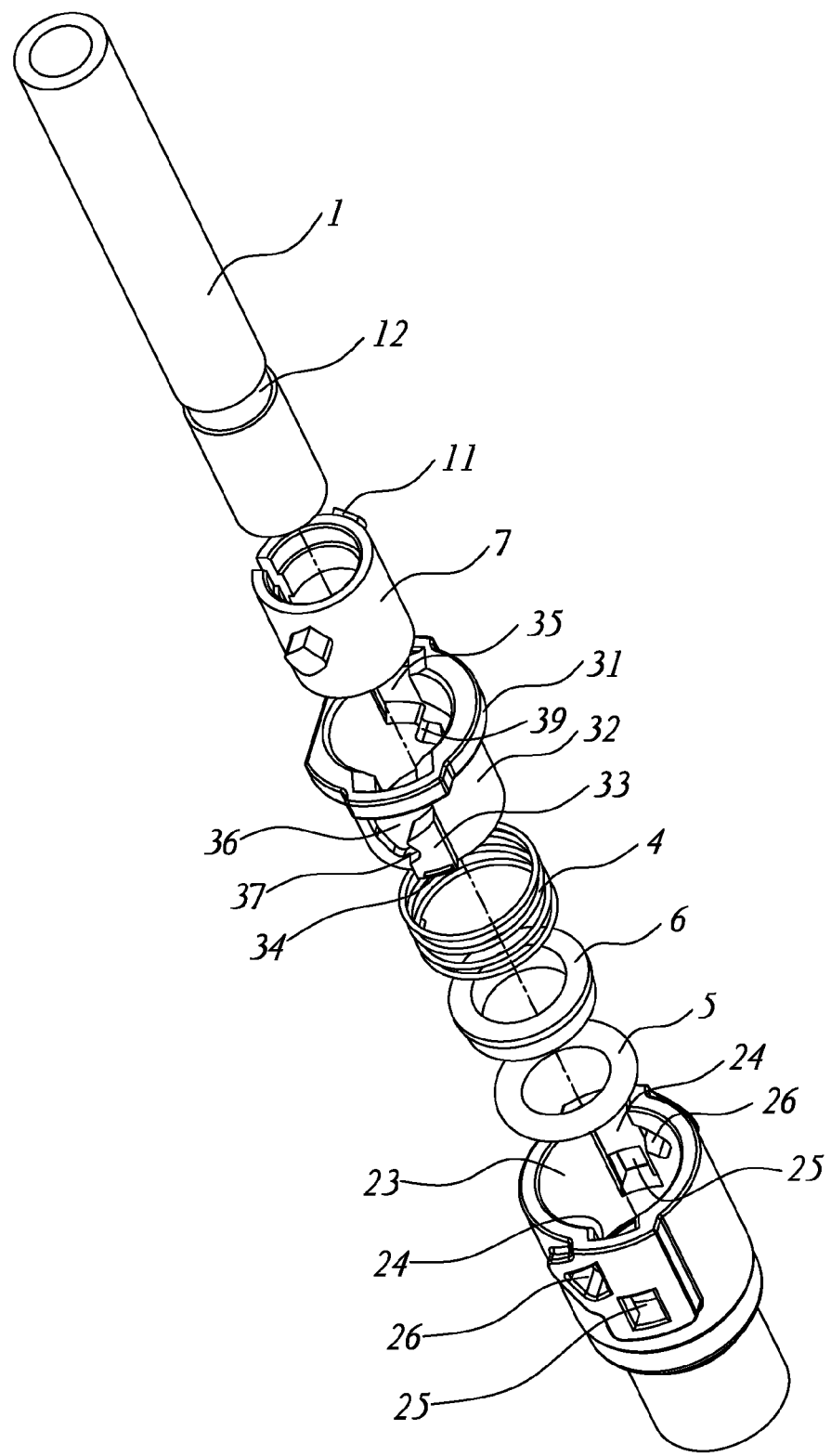
FIG. 3 is yet another exploded perspective view showing elements of the preferred embodiment of the present invention in an angle different from those of FIGS. 1 and 2.

With reference to FIGS. 1, 2 and 3, the pipe quick release structure constructed in accordance with the present invention is shown and has a first pipe 1 configured for connecting a distal end of a pipe, a second pipe 2 configured for connecting a distal end of another pipe and a joint 3 sandwiched between the first pipe 1 and the second pipe 2.

It is noted that the first pipe 1 has at least one boss 11 formed on an outer periphery thereof and a neck 12 defined in an outer periphery thereof. Another embodiment applicable for accomplishing the same objective of the present invention is that the at least one boss 11 is formed on a socket 7 having a slit axially defined in a wall of the socket 7 to facilitate extension of a distal end of the first pipe 1. In addition, the at least one boss 11 is extended internally inside the first tube 1 as well such that after the first pipe 1 extends through the socket 7, the at least one boss 11 is positioning in the neck 12 to secure connection between the first pipe 1 and the socket 7.

The second pipe 2 is provided with a first step 21 defined in an inner periphery thereof to receive therein a sealing ring 5, a second step 22 also formed in an inner periphery thereof to receive therein a positioning ring 6 and closely adjacent to the first step 22 to have a diameter larger than that of the first step 21, a receiving room 23 defined inside the second pipe 2, at least one axial trough 24 axially defined in an inner periphery thereof, a stop hole 25 defined at a bottom defining the at least one axial trough 24 and at least one inclined track 26 defined in the inner periphery thereof to communicate with the at least one axial trough 24.

A spring 4 is received in the receiving room 23 of the second pipe 2 and a distal end thereof abuts a side face of the positioning ring 6.

The joint 3 is a tubular element and movably received in the second pipe 2. The joint 3 has a flange 31 formed on a peripheral edge thereof, a sleeve 32 extending from a side face of the flange 31 to be received in the receiving room 23 of the second pipe 2, at least one ledge 32 (two are shown) formed on an outer periphery of the sleeve 32 to correspond to the at least one axial trough 24 and the at least one inclined track 26, a stop 34 formed on a bottom of the at least one ledge 32 to correspond to the stop hole 25 of the second pipe 2, at least one (two are shown) second axial trough 35 defined in an inner periphery of the joint 3 to slidably receive therein the at least one boss 11 of the first pipe 1, at least one inclined hole 36 defined to communicate with the at least one second axial trough 35, at least one recess 37 (two are shown) defined in a bottom face defining the at least one inclined hole 36 to communicate with the at least one inclined hole 36, a first arcuate surface 38 on an upper part of the recess 37 and a second arcuate surface 39 formed on an upper part of the at least one inclined hole 36.

Figure 4:
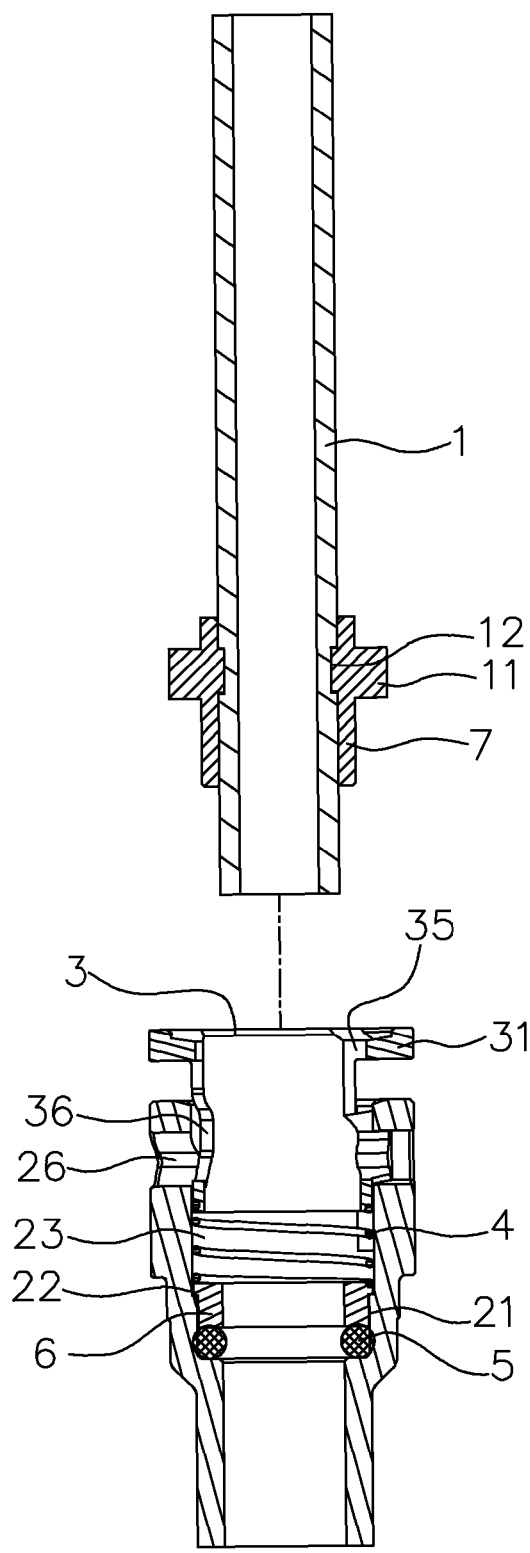
FIG. 4 is a partially exploded cross-sectional view showing that the joint is connected to the second pipe.

With reference to FIG. 4, it is noted that the sealing ring 5 is received in the second pipe 2 and supported by the first step 21 and a side face of the positioning ring 6 which is supported by the second step 22 is abutted against the sealing ring 5 while the spring 4 is received in the receiving room 23 to be supported and stopped by a side face of the positioning ring 6. Thereafter, the join 3 is extended into the second pipe 2 to allow the stop 34 of the joint 3 to engage with a side face defining the stop hole 25 such that the sealing ring 5, the positioning ring 6 and the joint 3 are all secured inside the second pipe 2. It is to be noted that after the sealing ring 5, the positioning ring 6 and the joint 3 are all secured inside the second pipe 2, there is still room for the spring 4 to be compressed and to recover after a force exerted on the spring 4 is removed. As a result, the joint 3 is able to move inside the second pipe 2 due to recovery force provided by the spring 4. As such, the inclined hole 36 of the joint 3 is selectively aligned with the inclined track 26 of the second pipe 2.

Figure 5:
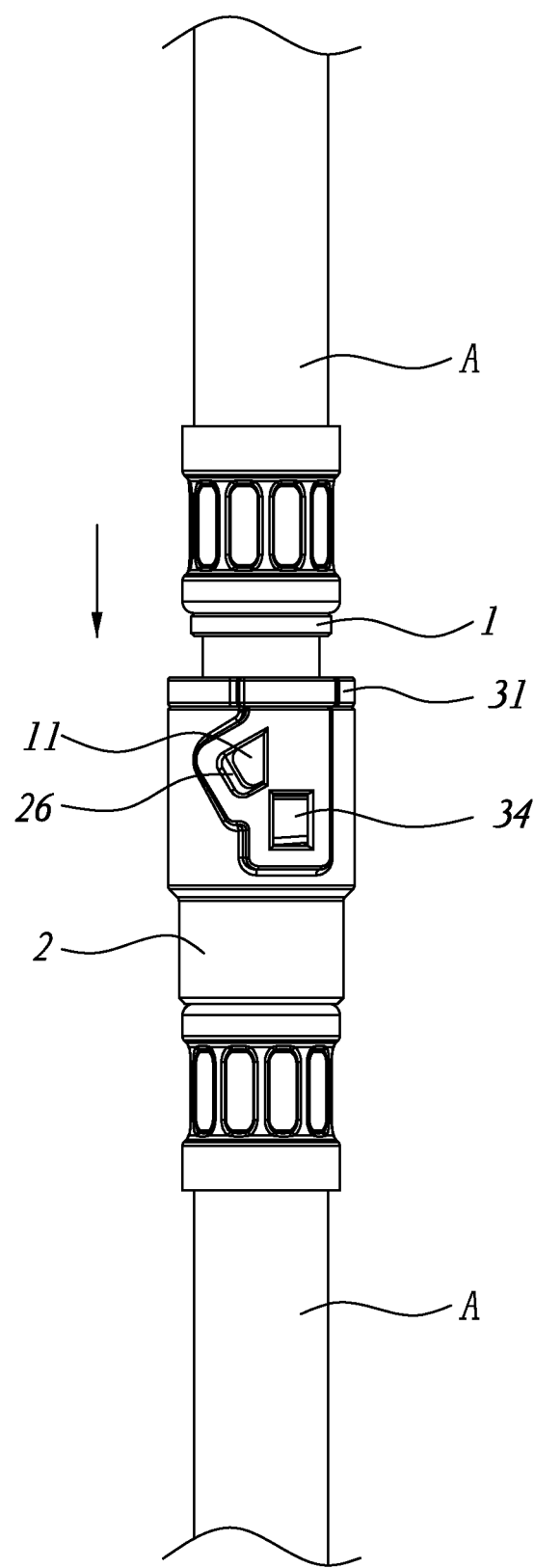
FIG. 5 is a plan view showing that the first pipe is to be connected to the second pipe via the joint.
Figure 6:
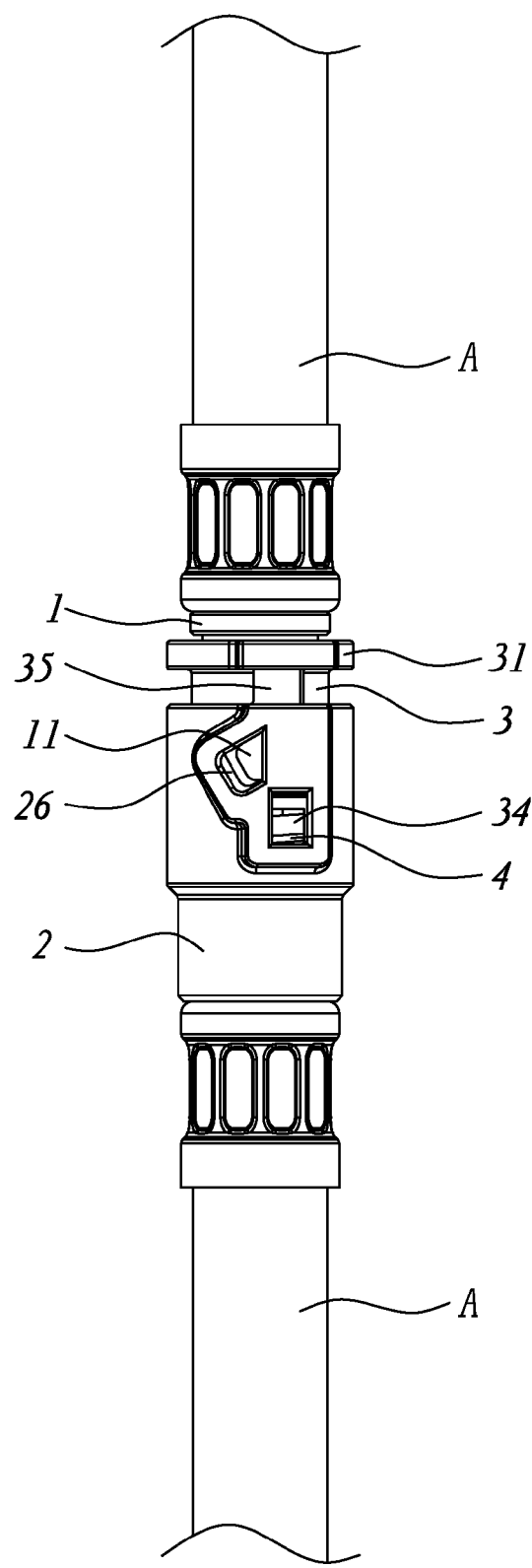
FIG. 6 is a schematic side plan view showing the at least one boss of the first pipe is sliding into the at least one inclined track of the second pipe.
Figure 7:
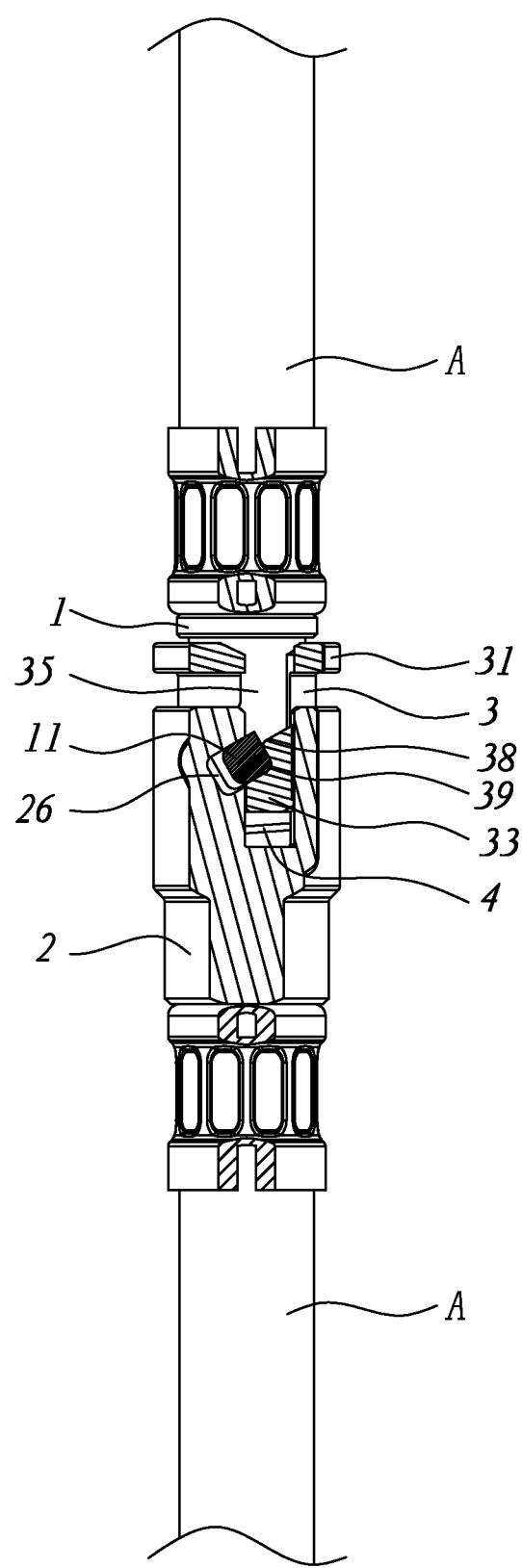
FIG. 7 is a schematic side plan view showing that the at least one boss of the first pipe is positioned.

With reference to FIGS. 5, 6 and 7, when the first pipe 1 is to be connected to the second pipe 2, a distal end of the first pipe 1 is extended into the receiving room 23 of the second pipe 2 with the at least one boss 11 formed on the outer periphery of either the collar 7 or of the first pipe 1 sliding along the second axial trough 35 of the joint 3. Because the at least one boss 11 of the first pipe 1 is in the rhombus shape or in the diamond shape, while the at least one boss 11 is guided along the at least one second axial rough 35 and an external force exerted on the first pipe 1 keeps the first pipe 1 extending further into the second pipe 2, the at least one boss 11 slides into the at least one inclined hole 36 and is stopped at the at least one recess 37. Furthermore, while the first pipe 1 is extended further into the second pipe 2, the joint 3 is also extended further into the second pipe 2 as the first pipe 1 is pushing the joint 3 to move along. While the joint 3 is moving along with the first pipe 1 further into the second pipe 2, the at least one inclined hole 36 gradually coincides with the at least inclined track 26. When the at least one inclined hole 36 finally coincides with the at least one inclined track 26, the at least one boss 11 of the first pipe 1 slides into the at least inclined track 26. After the at least one boss 11 slides into the inclined track 26 of the second pipe 2, the joint 3 as well as the first pipe 1 is pushed backward by recovery force from the compressed spring 4. As the joint 3 is moving backward due to the force from the spring 4, the at least one boss 11 of the first pipe 1 is securely positioned in the at least one inclined track 26 and the recess 37. After the first pipe 1 is securely received inside the second pipe 2, the assembling process of the pipe quick release structure is completed. Further, the connection between the first pipe 1 and the second pipe 2 is watertight because of the provision of the sealing ring 5.

Figure 8:
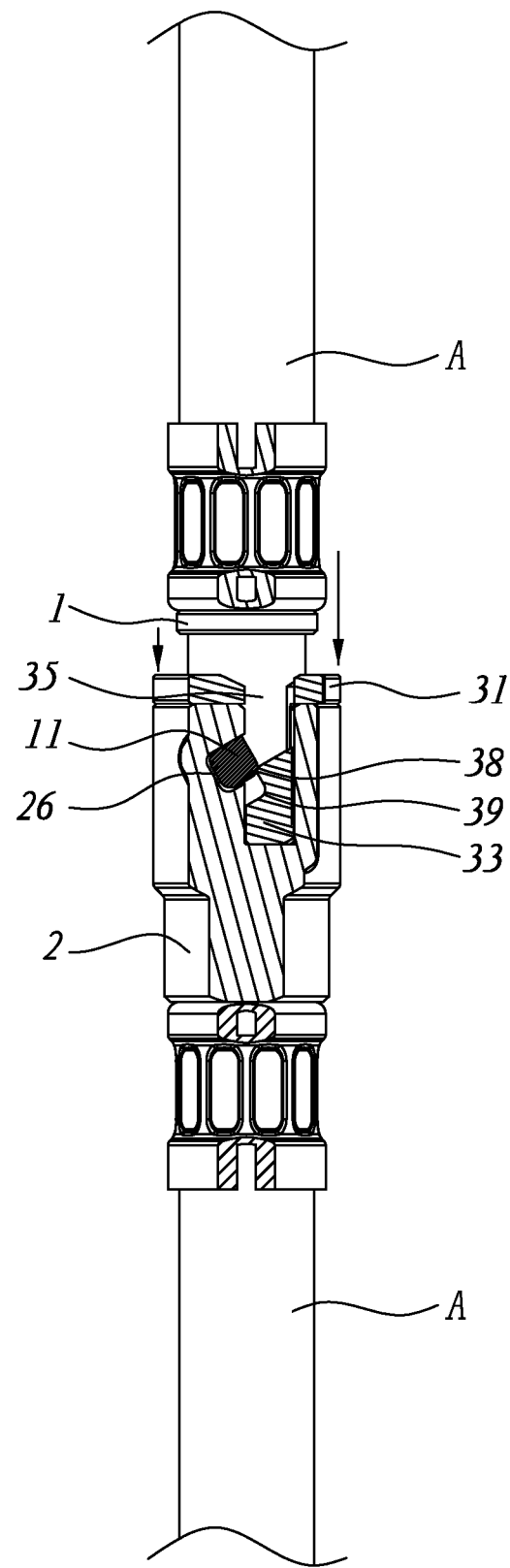
FIG. 8 is a schematic side plan view showing the joint is descended relative to the second pipe to release control to the first pipe.
Figure 9:
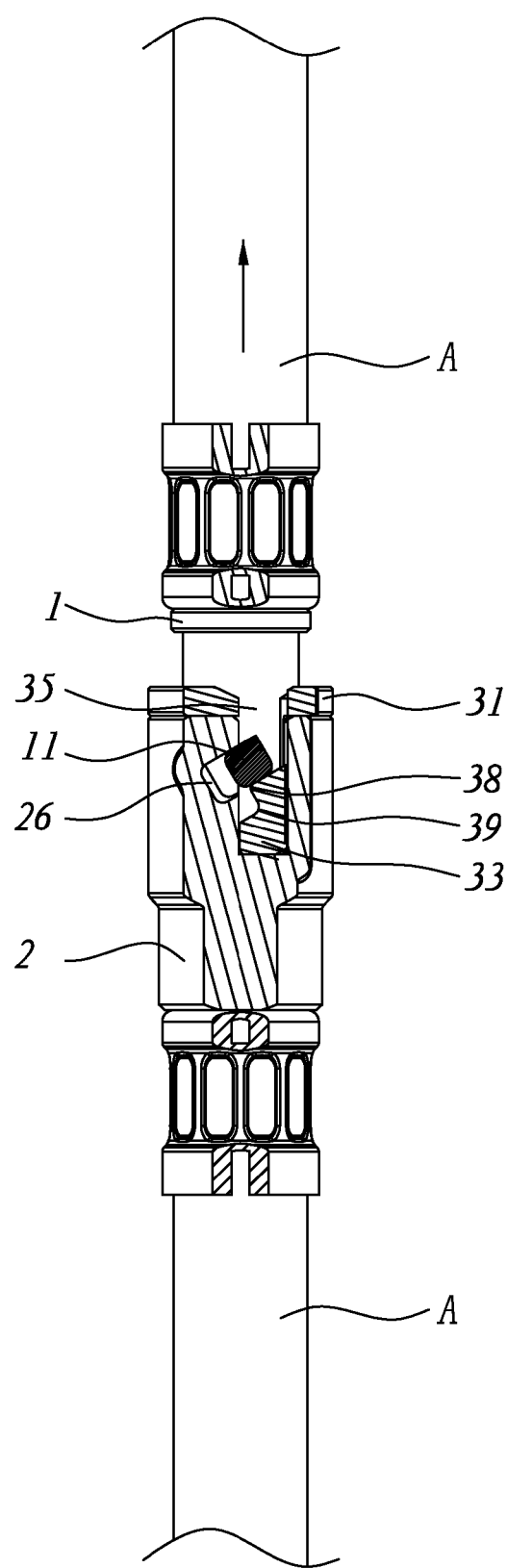
FIG. 9 is a schematic side plan view showing the release of the first pipe.

With reference to FIGS. 8 and 9, when the disconnection between the first pipe 1 and the second pipe 2 is necessary, an external force is applied to the joint 3 to force the joint 3 to extend further into the second pipe 2. While the joint 3 is extended further into the second pipe 2, the at least one inclined hole 36 once again coincides with the at least one inclined track 26 of the second pipe 2. In the meantime, under the influence of the first arcuate 38 and the second arcuate surface 39, the at least one boss 11 of the first pipe 11 is free from the restriction of the at least one inclined track 26 and the recess 37 and the first pipe 1 is able to leave the connection to the second pipe 2.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A pipe quick release structure comprising:
    a first pipe configured for connecting a distal end of a third pipe and having at least one boss adapted to be formed on an outer periphery of the first pipe;
    a second pipe configured for connecting a distal end of a fourth pipe and having at least one first axial trough defined in an inner periphery of the second pipe to correspond to and movably and selectively receive therein the at least one boss of the first pipe; and
    a joint securely received in the second pipe and having at least one axial ledge formed on an outer periphery thereof to correspond to and movably received in the at least one first axial trough of the second pipe, at least one second axial trough defined in an inner periphery of the joint to receive therein the at least one boss of the first pipe and at least one recess defined to communicate with the at least one second axial trough to selectively position the at least one boss of the first pipe so as to selectively secure connection of the first pipe to the second pipe,
    wherein the joint further has at least one inclined hole defined to communicate with the at least one second axial trough, and the second pipe further has at least one inclined track in communication with the at least one first axial trough of the first pipe to selectively receive therein the at least one boss of the first pipe;
    wherein when the first pipe is engaged with the second pipe, the at least one second axial trough mates and coincides with the at least one inclined track to allow the at least one boss to slide into the inclined track, so that the at least one boss is tightly against the at least one recess to be securely positioned in the at least one inclined track; and
    wherein when the joint is pushed until the at least one second axial trough mates and coincides with the at least one inclined track, the at least one boss is free from limitation of the at least one recess of the joint and the first pipe is separable from the second pipe.

2. The pipe quick release structure as claimed in claim 1 further comprising a sealing ring securely received in the second pipe, a positioning ring securely received in the second pipe and abutted against a periphery of the sealing ring and a spring supported by the positioning ring in the second pipe to provide a recovery force to the first pipe when the first pipe is moved toward the second pipe.

3. The pipe quick release structure as claimed in claim 2, wherein the joint further has a stop formed on the outer periphery thereof and the second pipe further has a stop hole defined to correspond to and securely receive therein the stop so as to position the sealing ring, the positioning ring and the spring inside the second pipe.

4. The pipe quick release structure as claimed in claim 3, wherein the at least one recess has a first smooth surface and a second smooth surface to facilitate entrance and escape of the at least one boss.

5. The pipe quick release structure as claimed in claim 2, wherein the at least one recess has a first smooth surface and a second smooth surface to facilitate entrance and escape of the at least one boss.

6. The pipe quick release structure as claimed in claim 1, wherein the joint further has a stop formed on the outer periphery thereof and the second pipe further has a stop hole defined to correspond to and securely receive therein the stop so as to position the sealing ring, the positioning ring and the spring inside the second pipe.

7. The pipe quick release structure as claimed in claim 6, wherein the at least one recess has a first smooth surface and a second smooth surface to facilitate entrance and escape of the at least one boss.

8. The pipe quick release structure as claimed in claim 1, wherein the joint further has a stop formed on the outer periphery thereof and the second pipe further has a stop hole defined to correspond to and securely receive therein the stop so as to position the sealing ring, the positioning ring and the spring inside the second pipe.

9. The pipe quick release structure as claimed in claim 8, wherein the at least one boss in rhombus shape.

10. The pipe quick release structure as claimed in claim 9, wherein the at least one recess has a first smooth surface and a second smooth surface to facilitate entrance and escape of the at least one boss.

11. The pipe quick release structure as claimed in claim 8, wherein the at least one recess has a first smooth surface and a second smooth surface to facilitate entrance and escape of the at least one boss.

12. The pipe quick release structure as claimed in claim 1, wherein the at least one boss in rhombus shape.

13. The pipe quick release structure as claimed in claim 12, wherein the at least one recess has a first smooth surface and a second smooth surface to facilitate entrance and escape of the at least one boss.

14. The pipe quick release structure as claimed in claim 1, wherein the at least one recess has a first smooth surface and a second smooth surface to facilitate entrance and escape of the at least one boss.

15. The pipe quick release structure as claimed in claim 1, wherein the at least one recess has a first smooth surface and a second smooth surface to facilitate entrance and escape of the at least one boss.

16. The pipe quick release structure as claimed in claim 1, wherein the at least one recess has a first smooth surface and a second smooth surface to facilitate entrance and escape of the at least one boss.

\* \* \* \* \*